(12) United States Patent
Foster

(10) Patent No.: US 8,745,431 B2
(45) Date of Patent: *Jun. 3, 2014

(54) COMPOUND UNIVERSAL SERIAL BUS ARCHITECTURE PROVIDING PRECISION SYNCHRONISATION TO AN EXTERNAL TIMEBASE

(75) Inventor: Peter Graham Foster, Parkside (AU)

(73) Assignee: Chronologic Pty. Ltd., Adelaide (AU)

( * ) Notice: Subject to any disclaimer, the term of this patent is extended or adjusted under 35 U.S.C. 154(b) by 251 days.

This patent is subject to a terminal disclaimer.

(21) Appl. No.: 13/320,279

(22) PCT Filed: May 20, 2010

(86) PCT No.: PCT/AU2010/000599
§ 371 (c)(1),
(2), (4) Date: Nov. 14, 2011

(87) PCT Pub. No.: WO2010/132938
PCT Pub. Date: Nov. 25, 2010

(65) Prior Publication Data
US 2012/0066537 A1    Mar. 15, 2012

Related U.S. Application Data

(60) Provisional application No. 61/179,904, filed on May 20, 2009.

(51) Int. Cl.
G06F 1/12    (2006.01)
(52) U.S. Cl.
USPC .......................................... 713/400; 375/354
(58) Field of Classification Search
USPC ....................................................... 713/400
See application file for complete search history.

(56) References Cited

U.S. PATENT DOCUMENTS

| 5,566,180 | A |   | 10/1996 | Eidson et al. |
| 6,092,210 | A | * | 7/2000 | Larky et al. ................... 713/400 |
| 6,278,710 | B1 |   | 8/2001 | Eidson |
| 6,343,364 | B1 |   | 1/2002 | Leydier et al. |
| 6,665,316 | B1 |   | 12/2003 | Eidson |

(Continued)

FOREIGN PATENT DOCUMENTS

| WO | WO 2004/008330 A1 | 1/2004 |
| WO | WO 2007/092997 A1 | 8/2007 |

OTHER PUBLICATIONS

"Universal Serial Bus Specification," Apr. 27, 2000; pp. 1-622; Revision 2.0.

(Continued)

Primary Examiner — Ryan Stiglic
(74) Attorney, Agent, or Firm — Oliff PLC

(57) ABSTRACT

A method of synchronizing a compound Super Speed USB device, comprising: providing data communication between a host computing device and the compound Super Speed USB device across the Super Speed USB communication channel; establishing a Super Speed USB communication channel to a Super Speed USB function of the compound USB device; establishing a non-Super Speed synchronization channel to a non-Super Speed USB function of the compound USB device; and synchronizing a local clock of the compound USB device to a periodic data structure within a data stream in the non-Super Speed synchronization channel so that the local clock can enable synchronous operation of the compound USB device with one or more comparable USB devices.

11 Claims, 7 Drawing Sheets

(56) References Cited

U.S. PATENT DOCUMENTS

| | | | |
|---|---|---|---|
| 6,741,952 B2 | 5/2004 | Eidson | |
| 7,251,199 B2 | 7/2007 | Eidson | |
| 7,539,793 B2* | 5/2009 | Foster et al. | 710/61 |
| 7,885,250 B2* | 2/2011 | Whittaker | 370/350 |
| 8,073,985 B1* | 12/2011 | Ni et al. | 710/11 |
| 8,200,873 B2* | 6/2012 | Tsukimori et al. | 710/117 |
| 8,285,897 B2* | 10/2012 | Weigold et al. | 710/61 |
| 8,301,831 B2* | 10/2012 | Ni et al. | 711/103 |
| 8,452,909 B2* | 5/2013 | Tang et al. | 710/313 |
| 8,499,186 B2* | 7/2013 | Tseng et al. | 713/500 |
| 8,516,290 B1* | 8/2013 | Thomas | 713/400 |
| 8,553,753 B2* | 10/2013 | Hsieh et al. | 375/231 |
| 2004/0088445 A1* | 5/2004 | Weigold et al. | 710/8 |
| 2006/0064522 A1* | 3/2006 | Weigold et al. | 710/61 |
| 2008/0025287 A1* | 1/2008 | Whittaker | 370/350 |
| 2009/0222685 A1* | 9/2009 | Foster et al. | 713/500 |
| 2011/0138214 A1* | 6/2011 | Tseng et al. | 713/500 |
| 2012/0042120 A1* | 2/2012 | Ni et al. | 711/103 |
| 2012/0077384 A1* | 3/2012 | Bar-Niv et al. | 439/625 |
| 2012/0084471 A1* | 4/2012 | Tang et al. | 710/104 |
| 2012/0084594 A1* | 4/2012 | Chen et al. | 713/501 |
| 2012/0144086 A1* | 6/2012 | Lai et al. | 710/313 |
| 2012/0287942 A1* | 11/2012 | Peng et al. | 370/465 |
| 2013/0191568 A1* | 7/2013 | Hershko et al. | 710/106 |
| 2013/0297962 A1* | 11/2013 | Tseng et al. | 713/500 |

OTHER PUBLICATIONS

"Universal Serial Bus 3.0 Specification," Nov. 12, 2008; Revision 1.0.
International Search Report issued in Application No. PCT/AU2010/000599; Dated Aug. 4, 2010.
International Preliminary Report on Patentability issued in Application No. PCT/AU2010/000599; Dated Nov. 22, 2011.

* cited by examiner

US 8,745,431 B2

COMPOUND UNIVERSAL SERIAL BUS ARCHITECTURE PROVIDING PRECISION SYNCHRONISATION TO AN EXTERNAL TIMEBASE

RELATED APPLICATION

This application is based on and claims the benefit of the filing date of U.S. application no. 61/179,904 filed 20 May 2009, the content of which as filed is incorporated herein by reference in its entirety.

FIELD OF THE INVENTION

The present invention relates to a method and apparatus for providing a synchronization and timing system, with connectivity based on revision three of the Universal Serial Bus (USB) architecture (or USB 3.0), of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification up to and including revision 2.0 was intended to facilitate the interoperation of devices from different vendors in an open architecture. USB 2.0 data is encoded using differential signalling (viz. in which two wires transfer the information) in the form of the difference between the signal levels of those two wires. The USB 2.0 specification is intended as an enhancement to the PC architecture, spanning portable, desktop and home environments.

However, USB was user focussed so the USB 2.0 specification lacked a mechanism for synchronising devices to any great precision. Several proposals attempted to address this and other deficiencies. For example, U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

WO 2007/092997 (Foster et al.) discloses a synchronized USB device that allows the generation of accurate clock frequencies on board the USB device regardless of the accuracy of the clock in the Host PC. The USB SOF packet is decoded by the USB device, and treated as a clock carrier signal instead of acting as a clock reference.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

U.S. patent application Ser. No. 12/279,328 (Foster et. al.) teaches synchronisation of the local clocks of a plurality of USB devices to a timebase received from another interface. In one embodiment, a USB device contains a local clock that is synchronised to an externally provided time signature across Ethernet using the IEEE-1588 protocol. In yet another embodiment the USB device's clock is synchronised to a timebase derived from a Global Positioning System (GPS) synchronised clock.

All of the above systems work within the bounds of conventional USB 2.0 and as such are limited in several areas. USB 2.0 is limited in range by the device response timeout. This is the window of time that the USB Host Controller allocates for receipt of a signal from a given USB device in response to a request from said USB Host Controller. The physical reach of USB 2.0 is therefore approximately 25 m.

The USB 3.0 specification was released in November 2008 and is also focussed on consumer applications. The USB 3.0 specification makes significant changes to the architecture of USB. In particular, the background art synchronisation schemes discussed above will not work with the newer 5 Gb/s protocol (termed 'SuperSpeed USB') because it does away with the broadcast mechanism for SOF packets.

USB 3.0 defines two parallel and independent USB busses on the same connection cable. Firstly, the USB 2.0 bus remains unchanged (for backward compatibility) and offers Low Speed (1.5 Mb/s), Full Speed (12 Mb/s) and High Speed (480 Mb/s) protocols. The second bus—for 5 Gb/s traffic—provides the SuperSpeed USB. These busses operate independently, except that operation of the busses to a given USB device is mutually exclusive. That is, if a SuperSpeed connection is possible, then the USB 2.0 bus in disconnected to that device.

The dual-bus architecture of USB 3.0 is depicted schematically at 10 in FIG. 1. Personal Computer 12, containing USB Host Controller 14, is connected to USB 3.0 Hub 16 by first USB 3.0-compliant cable 18; USB 3.0 device 20 is connected to a downstream port 22 of USB 3.0 Hub 16 by second USB 3.0-compliant cable 24.

USB Host Controller 14 contains both a USB 2.0 Host 26 and a SuperSpeed Host 28. These two hosts 26, 28 are independent of one another, and each host 26, 28 is capable of connecting up to 127 devices (including hubs). USB 3.0-compliant cables are compound cables, containing a USB 2.0-compliant cable and a series of shielded conductors capable of transmitting SuperSpeed signals. Hence, USB 3.0-compliant cable 18 comprises USB 2.0-compliant cable 30 and shielded conductors 32.

USB 3.0 Hub 16 contains both a USB 2.0 Hub function 34 and a SuperSpeed Hub function 36, each connected directly to its respective Host 26, 28 by compound cable 18. USB 3.0 device 20 contains both a USB 2.0 device function 38 and a SuperSpeed device function 40, each connected back to its respective hub function 34, 36 of USB 3.0 Hub 16 by compound cable 24.

At enumeration of USB 3.0 device 20, SuperSpeed Host 28 checks for the presence of a SuperSpeed device function (40). If a SuperSpeed device is found, then a connection is established. If a SuperSpeed device is not found (as in the case where only a USB 2.0 device is connected to port 22), then the USB 2.0 Host 26 checks for the presence of a USB 2.0 device function (38) at device 20. Once the Host Controller 14 determines which device function is connected, it tells the USB 3.0 Hub 16 to only enable communication for downstream port 22 corresponding to whether the USB 2.0 device function 38 or SuperSpeed device function 40 is attached. This means that only one of the two parallel busses is in operation at any one time to an end device such as USB 3.0 device 20.

Furthermore, SuperSpeed USB has a different architecture from that of the USB 2.0 bus. Very high speed communication systems consume large amounts of power owing to high bit rates. A design requirement of SuperSpeed USB was lower power consumption, to extend the battery life of user devices. This has resulted in a change from the previous broadcast design of the USB 2.0: SuperSpeed is not a broadcast bus, but rather directs communication packets to a specific node in the system and shuts down communication on idle links.

This significantly affects any extension of the synchronisation schemes of, for example, U.S. patent application Ser. No. 12/279,328, whose method and apparatus for synchronising devices is based on a broadcast clock carrier signal that is delivered to each device on the bus, which is unsuitable in SuperSpeed USB.

A SuperSpeed Hub function acts as a device to the host (or upstream port) and as a host to the device (or downstream port). This means that the SuperSpeed Hub function acts to buffer and schedule transactions on its downstream ports rather than merely acting as a repeater. Similarly, the SuperSpeed Hub function does so with scheduling transmissions on the upstream port. A heavily burdened Hub function can therefore add significant non-deterministic delays in packet transmission through the system. This also precludes the use of USB 2.0 synchronisation schemes such as that of U.S. patent application Ser. No. 12/279,328 from operating on SuperSpeed USB.

The crude Isochronous synchronisation of USB 2.0 has been significantly improved in the USB 3.0 specification. Opening an Isochronous communication pipe between a Host Controller and a USB device guarantees a fixed bandwidth allocation in each Service Interval for the communication pipe. The Isochronous Protocol of USB 3.0 contains a so-called Isochronous Timestamp Packet (ITP), which is sent at somewhat regular intervals to each Isochronous Endpoint and which contains a timestamp of the beginning of ITP transmission by the USB Host Physical Layer (Phy) in the time domain of the Host Controller. The Isochronous Timestamp Packet is accurate to about 25 ns. SuperSpeed USB shuts down idle links to conserve power, but links must be active in order to receive an Isochronous Timestamp Packet. The Host Controller must therefore guarantee that all links to a device are in full active mode (termed power state U0) before transmission of the Isochronous Timestamp Packet.

Unfortunately the Isochronous Timestamp packet can be delayed in propagation down the USB network. USB 3.0 also does not provide a way of determining the propagation time of packets in SuperSpeed USB and hence no way of accurately knowing the phase relationship between time domains on different USB devices. Phase differences of several hundred nanoseconds are expected to be a best case scenario with SuperSpeed USB making it impractical for instrumentation or other precision timing requirements.

U.S. Pat. No. 5,566,180 (Eidson et al.) discloses a method of synchronising clocks in which a series of devices on a communication network transmit their local time to each other and network propagation time is determined by the ensemble of messages. Further disclosures by Eidson (U.S. Pat. Nos. 6,278,710, 6,665,316, 6,741,952 and 7,251,199) extend this concept but merely work toward a synchronisation scheme in which a constant stream of synchronising messages are transferred between each of the nodes of a distributed instrument network via Ethernet. This continual messaging consumes bandwidth and limits the accuracy of the possible synchronisation to several hundred nano-seconds in a point-to-point arrangement and substantially lower accuracy (typically micro-seconds) in a conventional switched subnet.

It should be understood that the terms 'clock signals' and 'synchronisation' in this disclosure are used to refer to clock signals, trigger signals, delay compensation information and propagation time measurement messages. It should also be understood that a 'notion of time' in this disclosure is used to denote an epoch or 'real time' and can also be used to refer to the combination of a clock signal and an associated epoch.

SUMMARY OF THE INVENTION

It is a general object of the present invention to enable precision synchronisation of a plurality USB devices, up to a predefined maximum, according to the USB3 Specification.

It is an object of the present invention to enable synchronous operation of SuperSpeed connected USB devices and non-SuperSpeed connected USB devices on a common USB.

According to a first broad aspect, the present invention provides a method of synchronising a compound SuperSpeed USB device, comprising:

providing data communication between a host computing device and the compound SuperSpeed USB device across the SuperSpeed USB communication channel;

establishing a SuperSpeed USB communication channel to a SuperSpeed USB function of the compound USB device;

establishing a non-SuperSpeed synchronisation channel to a non-SuperSpeed USB function of the compound USB device; and synchronising a local clock of the compound USB device to a periodic data structure within a data stream in the non-SuperSpeed synchronisation channel so that the local clock can enable synchronous operation of the compound USB device with one or more comparable USB devices.

Thus, a compound USB device may be synchronised. The non-SuperSpeed USB function provides a synchronous clock (viz. synchronous with other USB devices in the network) which can be used by either the SuperSpeed or non-SuperSpeed USB functions. Either or both of the SuperSpeed and non-SuperSpeed functions of the compound device may be synchronised with such other USB devices in principle, but it is envisaged that the most practical embodiment would involve operating the SuperSpeed function of the compound device synchronously with such other USB devices (as the SuperSpeed function has higher bandwidth).

Synchronising the local clock may comprise syntonisation of clock frequency and phase compensation of a clock signal issued by the local clock by a predefined amount.

In one embodiment, the method includes synchronising the local clock to the data stream at an upstream port of a USB hub of the compound USB device that provides a connection point of the compound USB device to a USB network. According to another particular embodiment the local clock is synchronised to the data stream at the connection point of the non-SuperSpeed USB function, or in other words the downstream port of the USB Hub to which the non-SuperSpeed USB device is connected.

The synchronisation of the local clock is by any method disclosed in this invention that relates to a non-SuperSpeed synchronisation channel, and may contain synchronisation of a clock frequency, determination of an notion of real time, determination of a signal propagation time of clock carrier signals in the USB and phase correction for the local clock's clock signal and notion of real time.

In one particular embodiment, the method is applied to a plurality of USB devices to create a plurality of synchronised USB devices operable as a unified, virtual, distributed synchronous instrument.

In a second broad aspect, the present invention provides a compound USB device, comprising:
  first circuitry, adapted to perform at least one SuperSpeed USB device function;
  second circuitry, adapted to perform at least one non-SuperSpeed USB device function;
  circuitry adapted to perform a SuperSpeed USB hub function that provides connectivity to an upstream USB Hub or Host Controller, and downstream connectivity to the first circuitry and to the second circuitry;
  circuitry for decoding periodic signal structures from the non-SuperSpeed USB data stream;
  a local clock; and
  circuitry for synchronising the local clock to the periodic signal structures;
  wherein the local clock is synchronised using synchronisation information in the non-SuperSpeed USB data stream, and the SuperSpeed USB device functions and the non-SuperSpeed USB device function operate simultaneously.

Thus, a synchronised compound USB3 device is provided.

The synchronisation information may contain a periodic clock carrier signal, synchronous clocking signals, absolute time reference and trigger signals. In one embodiment the synchronisation information comprises a trigger signal, a clock signal and clock phase information.

The local clock may be synchronised by being phase locked to a periodic clock carrier signal in the non-SuperSpeed data stream.

The compound USB device may be configured to use the SuperSpeed connection for communication and the non-SuperSpeed connection (at the same time) for synchronisation.

In order to comply with the USB3 specification, each SuperSpeed compliant device must support communication across both a SuperSpeed channel and a non-SuperSpeed channel (whether HighSpeed, FullSpeed or LowSpeed). This requirement must be fulfilled at the same USB3 Hub connection point. Hence, for the USB device to be compliant with the USB Specification, the USB device of this aspect contains at least one SuperSpeed and at least one non-SuperSpeed device function at the same USB Hub port, and at least one other non-SuperSpeed USB device function at yet another USB Hub port of the compound USB device.

The USB3 hub function, the SuperSpeed USB device function and the one or more non-SuperSpeed USB device functions may be combined within one component (for example a single silicon chip) or be any combination of physically separate components.

In a further embodiment the compound USB Device may comprise a USB hub function adapted to provide a plurality of downstream ports and a non-SuperSpeed USB device function adapted to provide a synchronisation channel. The non-SuperSpeed device function may contain a local clock that is synchronised using synchronisation information contained in the non-SuperSpeed USB data stream.

In this way, an External USB device function can be used in conjunction with the compound USB Device by attaching the External USB device function to one of the downstream ports of the USB Hub function. Additionally, the synchronised non-SuperSpeed USB device function may provide clock, time and trigger signals to the External USB Device function.

Furthermore, the compound USB Device and the External USB Device function may be combined within a single enclosure (as, for example, an end user product).

The USB Hub function may be either a SuperSpeed Hub function or a non-SuperSpeed Hub function, allowing downstream connection to either a SuperSpeed or non-SuperSpeed External device function.

According to a third broad aspect, the present invention provides a method of providing a synchronisation channel to a SuperSpeed compliant USB device, the method comprising:
  providing a different unique device descriptor (typically in the form of a Globally Unique Identifier or GUID) to each of a SuperSpeed function and a non-SuperSpeed function of the SuperSpeed compliant USB device; and
  providing a Container ID for the SuperSpeed compliant USB device;
  wherein the SuperSpeed and non-SuperSpeed functions are viewable as parts of a compound USB device (such as by a USB Host Controller's operating system).

Thus, different GUIDs in the SuperSpeed and non-SuperSpeed functions are employed, such as on the one chip, permitting both devices to be registered with the operating system at the same time. In this way a USB device may operate with connectivity through the SuperSpeed function while at the same time having synchronous clocking and the provision of absolute time reference and trigger signals provided by the non-SuperSpeed function.

This aspect of the invention has a further advantage over the second aspect. The second aspect could be implemented with a SuperSpeed USB compliant device, containing a SuperSpeed function and a non-SuperSpeed function, a USB Hub and a second non-SuperSpeed USB device, with the SuperSpeed compliant device providing the communication channel and the non-SuperSpeed device provided the synchronisation channel. However, the approach of the third aspect is less burdened with cost, device count and physical space requirements (from adding a USB Hub chip and additional non-SuperSpeed USB device chip to the design).

According to this aspect, the Container ID provides a logical grouping of devices within the operating system resource manager and the SuperSpeed compliant USB device appears as a single device with multiple functions. In one embodiment, the SuperSpeed function is a SuperSpeed communication channel and the non-SuperSpeed function is a non-SuperSpeed synchronisation channel.

According to this aspect, the invention also provides a method of synchronising a non-SuperSpeed synchronisation channel of a SuperSpeed compliant USB device having a SuperSpeed function acting as a communication channel and a non-SuperSpeed function acting as the non-SuperSpeed synchronisation channel, the method comprising:
  locking or syntonising the local clock of the non-SuperSpeed USB function to a clock source derived from the Host Controller;
  synchronising, or adjusting the phase of, the local clock; and
  providing the local clock with a notion of time.

In one embodiment the method of locking or syntonising the local clock of the non-SuperSpeed USB function comprises:
  observing a USB data stream local to the non-SuperSpeed USB function;
  decoding a periodic signal structure from the USB data stream;

generating an event signal local to the non-SuperSpeed USB function corresponding to decoding said periodic signal structure from said USB data stream (and hence itself periodic); and locking the frequency of the local clock to the periodic event signal.

Thus, the periodic event signal provides a reference to which the phase-locked-loop local clock synchronises its frequency.

In one embodiment, the periodic signal structure comprises one or more OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

The SuperSpeed compliant device may be operable as a member of a synchronised multichannel USB.

According to a fourth broad aspect, the invention provides a method of synchronising a SuperSpeed USB device in a USB network, comprising:

establishing a non-SuperSpeed communication channel to a non-SuperSpeed USB function of the SuperSpeed USB device;

measuring a propagation time of a signal or signals from a predefined point in the USB network to the SuperSpeed USB device and back;

establishing a SuperSpeed USB communication channel to a SuperSpeed USB function of the SuperSpeed USB device;

syntonising a local clock of the SuperSpeed USB device using the periodic Isochronous Timestamp Packets as defined in the USB specification;

placing the local clock into a holdover mode wherein the local clock frequency is maintained constant in a temporary absence of syntonisation information;

establishing a non-SuperSpeed communication channel to a non-SuperSpeed USB function of the SuperSpeed USB device;

transmitting a synchronisation signal to the SuperSpeed USB device;

establishing a SuperSpeed USB communication channel to a SuperSpeed USB function of the SuperSpeed USB device;

removing the local clock from the holdover mode and continuing syntonisation lock of the local clock to the Isochronous Timestamp Packets;

transmitting a phase signal to the SuperSpeed USB device indicative of the phase compensation required to synchronise the local clock; and synchronising the local clock by applying the phase compensation to the local clock.

The method may comprise using predictive filtering to reduce the drift of the local clock during the holdover period.

According to this aspect, the invention also provides a SuperSpeed USB device, comprising:

SuperSpeed USB hub circuitry for providing an upstream connection that comprises a SuperSpeed USB connection and a non-SuperSpeed USB connection, and for providing one or more SuperSpeed downstream connections and one or more non-SuperSpeed downstream connections;

first circuitry, adapted to establish a SuperSpeed USB connection to the USB device;

second circuitry, adapted to establish a non-SuperSpeed USB connection to the USB device;

a local clock;

third circuitry, adapted to syntonise the local clock via the SuperSpeed USB connection;

fourth circuitry, adapted to provide a holdover function for the local clock;

fifth circuitry, adapted to phase adjust an output of the local clock;

wherein the first circuitry and second circuitry are operable at the same time.

The device may comprise predictive filtering circuitry adapted to stabilise a frequency of the local clock is in a temporary absence of syntonisation information.

According to this aspect, the invention also provides SuperSpeed USB device, comprising:

SuperSpeed USB hub circuitry for providing an upstream connection comprising a SuperSpeed USB connection and a non-SuperSpeed USB connection, and for providing a one or more SuperSpeed downstream connections and one or more non-SuperSpeed downstream connections;

first circuitry, adapted to establish a SuperSpeed USB connection to the USB device;

second circuitry, adapted to establish a non-SuperSpeed USB connection to the USB device;

a local clock;

third circuitry, adapted to syntonise the local clock via the SuperSpeed USB connection;

fourth circuitry, adapted to provide a holdover function for the local clock;

fifth circuitry, adapted to adjust a phase of syntonisation signals prior to syntonising the local clock;

wherein the first circuitry and second circuitry are operable at the same time.

The device may comprise predictive filtering circuitry adapted to stabilise a frequency of the local clock in a temporary absence of syntonisation information.

According to a fifth broad aspect, the invention provides a method of providing a synchronisation channel to a SuperSpeed USB device, the method comprising:

providing a first unique device descriptor to a SuperSpeed function of the SuperSpeed USB device providing a second unique device descriptor to a non-SuperSpeed function of the SuperSpeed USB device;

providing a Container ID for the SuperSpeed USB device;

establishing a SuperSpeed communication channel to the SuperSpeed USB device;

establishing a non-SuperSpeed communication channel to the USB device;

wherein the SuperSpeed communication channel and non-SuperSpeed communication channel are operable at the same time; and wherein the SuperSpeed function and non-SuperSpeed function are viewable as parts of a compound USB device by an operating system of a USB Host Controller, thereby enabling both the SuperSpeed function and non-SuperSpeed function to connect to the USB Host Controller simultaneously.

According to this aspect, the invention also provides an apparatus for providing a synchronisation channel to a SuperSpeed USB device attached thereto, the apparatus comprising:

SuperSpeed USB hub circuitry for providing as upstream USB connection comprising a SuperSpeed USB connection and a non-SuperSpeed USB connection, and for providing a one or more SuperSpeed downstream connections and one or more non-SuperSpeed downstream connections;

first circuitry, adapted to establish a SuperSpeed USB connection to the USB device;

second circuitry, adapted to establish a non-SuperSpeed USB connection to the USB device;

third circuitry, adapted to provide a non-SuperSpeed synchronisation channel across the non-SuperSpeed USB connection.

wherein the first circuitry and second circuitry are operable at the same time.

It should be noted that all the various features of each of the above aspects of the invention can be combined as suitable and desired.

Furthermore, it should be noted that the invention also provides apparatuses and systems arranged to perform each of the methods of the invention described above.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWINGS

In order that the present invention may be more clearly ascertained, embodiments will now be described, by way of example, with reference to the accompanying drawing, in which.

DETAILED DESCRIPTION OF THE INVENTION

Figure 1:
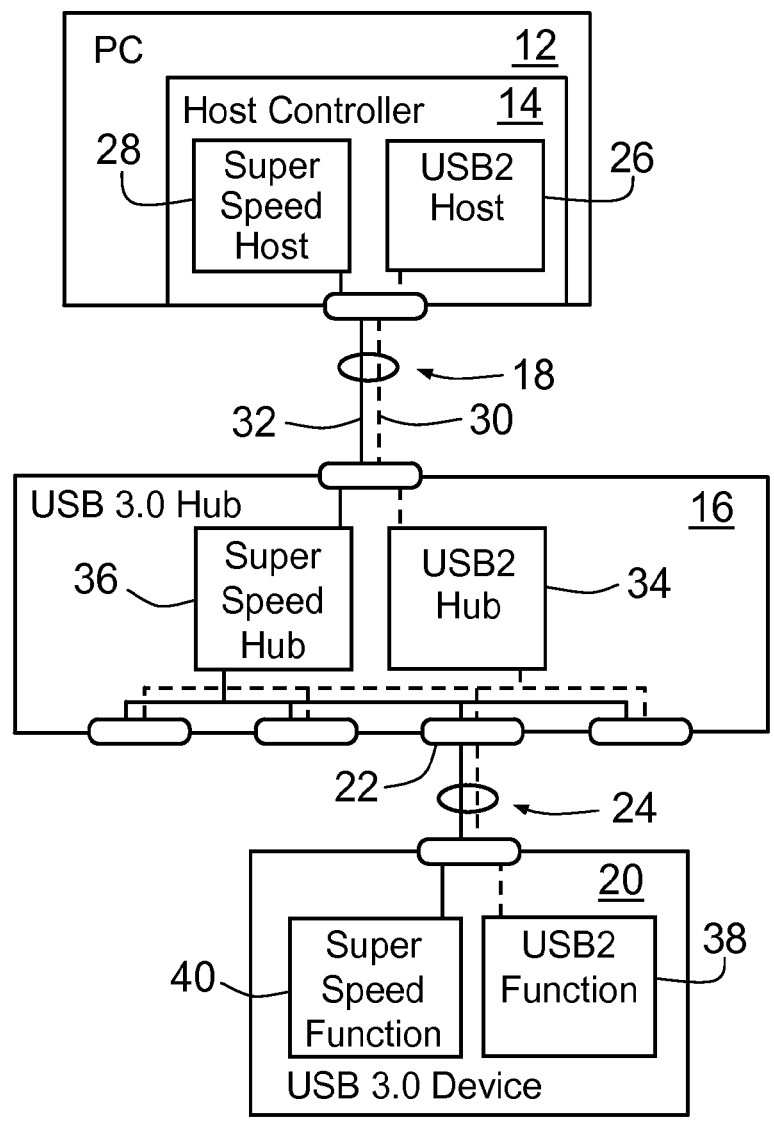
FIG. 1 is a schematic diagram of the dual-bus architecture of USB3 according to the background art.
Figure 2:
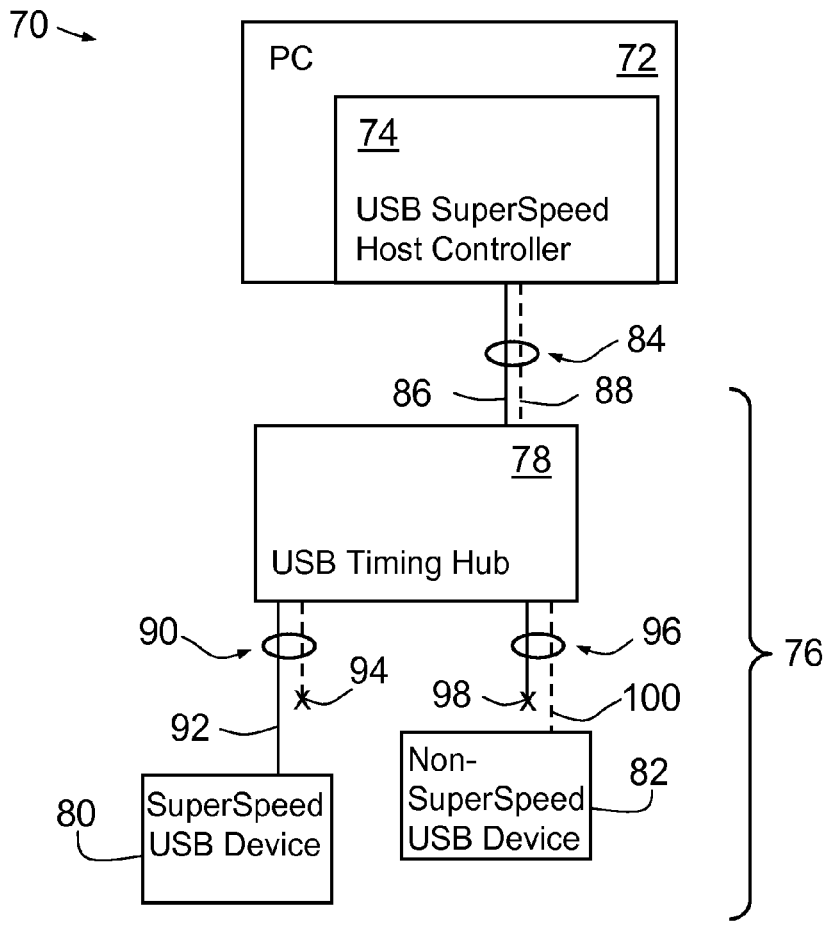
FIG. 2 is a schematic diagram of a synchronised USB according to an embodiment of the present invention, containing both SuperSpeed and non-SuperSpeed USB devices.

A synchronised USB according to a first embodiment of the present invention is shown schematically at 70 in FIG. 2, provided in a personal computer (PC) 72. PC 72 includes a SuperSpeed USB Host Controller 74 that is connected to a network 76 containing a SuperSpeed USB Timing Hub 78, a SuperSpeed USB device 80 and a non-SuperSpeed USB device 82. USB Host Controller 74 is connected to USB Timing Hub 78 by compound USB cable 84 comprising SuperSpeed conductors 86 and non-SuperSpeed conductors 88.

USB Timing Hub 78 supports attachment of both a Super-Speed USB device 80 and non-SuperSpeed USB device 82, so both SuperSpeed conductors 86 and non-SuperSpeed conductors 88 carry signals between SuperSpeed USB Host Controller 74 and USB Timing Hub 78.

SuperSpeed USB device 80 is connected to USB Timing Hub 78 by SuperSpeed-compliant compound USB cable 90, comprising SuperSpeed conductors 92 and non-SuperSpeed conductors 94. As device USB 80 is a SuperSpeed USB device, USB Timing Hub 78 turns off non-SuperSpeed data traffic to conductors 94, so the connection between Super-Speed device 80 and USB Timing Hub 78 is provided by SuperSpeed conductors 92 alone. Non-SuperSpeed USB device 82 is connected to USB Timing Hub 78 by Super-Speed-compliant compound USB cable 96, comprising SuperSpeed conductors 98 and non-SuperSpeed conductors 100. There are no signals across the SuperSpeed USB conductors 98 of cable 96 while a data connection is being made to Non-SuperSpeed USB device 82 by the non-SuperSpeed conductors 100.

In this example, SuperSpeed conductors 92 (of compound USB cable 90) between USB Timing Hub 78 and SuperSpeed USB device 80 are adapted to provide a SuperSpeed synchronisation channel, whilst non-SuperSpeed cable segment 100 (of compound USB cable 96) between USB Timing Hub 78 and non-SuperSpeed USB device 82 can be said to provide a non-SuperSpeed synchronisation channel.

Figure 3:
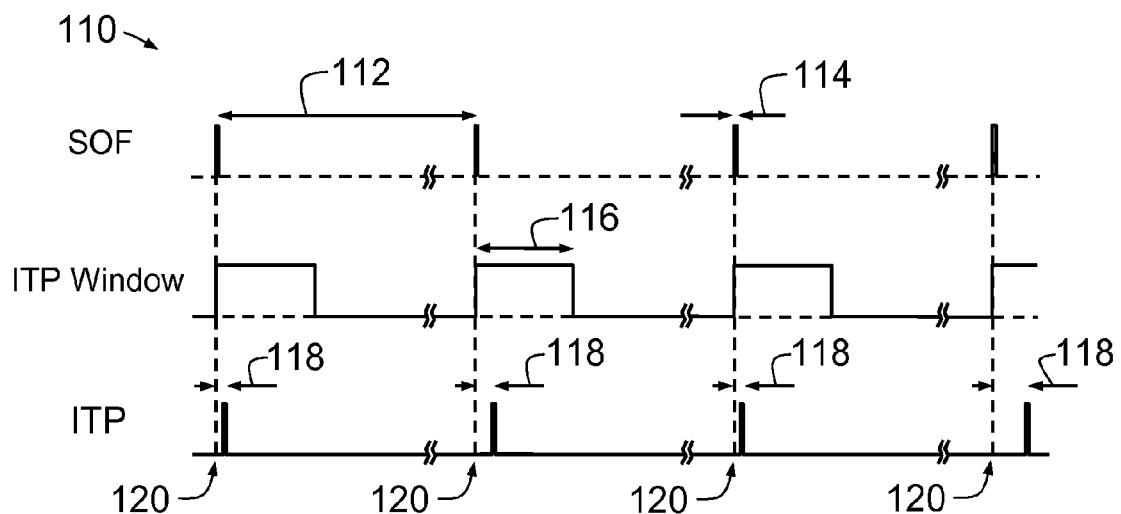
FIG. 3 is a schematic diagram of the relative timing of periodic timing signals used for synchronisation of Super-Speed and non-SuperSpeed USB devices of the synchronised USB of FIG. 2.

According to this embodiment, SuperSpeed USB device 80 is synchronised to non-SuperSpeed USB device 82. Frames in non-SuperSpeed USB traffic have a substantially constant phase relationship with the Isochronous SuperSpeed Timestamp packets. FIG. 3 is a schematic representation of an exemplary timing diagram at 110 of timing signal traffic through USB Timing Hub 78 of FIG. 2 showing the relationships between timing signals of a SuperSpeed and non-SuperSpeed synchronisation channel.

Referring to FIG. 3, bus interval 112—defined as a 125 µs period—is common to both SuperSpeed and non-Super-Speed busses. The typical periodic signal structure chosen for synchronisation of a non-SuperSpeed synchronisation channel is the Start of Frame (SOF) packet, which occurs once every bus interval at the bus interval boundary. There is a very tight tolerance 114 in transmission of a Start of Frame packet (see upper register of FIG. 3): Start of Frame packets must be transmitted within nanoseconds of the bus interval boundary.

By contrast, a SuperSpeed synchronisation channel has a very loose tolerance 116 on the Isochronous Timestamp Packet (ITP) Window (middle register of FIG. 3). The ITP Window allows transmission of an ITP anywhere in the region of 8 µs following a bus interval boundary. This results in significant timing jitter in transmission of the Isochronous Timestamp Packet (time elapsed 118 since respective bus interval boundary 120). The Isochronous Timestamp Packet (see lower register of FIG. 3) also contains a timestamp of the time elapsed from the bus interval boundary to the transmission of the Isochronous Timestamp Packet. This mechanism allows the attached USB device to keep track of the Host Controller time.

Nevertheless, the two time signatures predominantly used in this embodiment have a known phase relationship allowing accurate synchronisation of the SuperSpeed and non-SuperSpeed synchronisation channels.

Figure 4A:
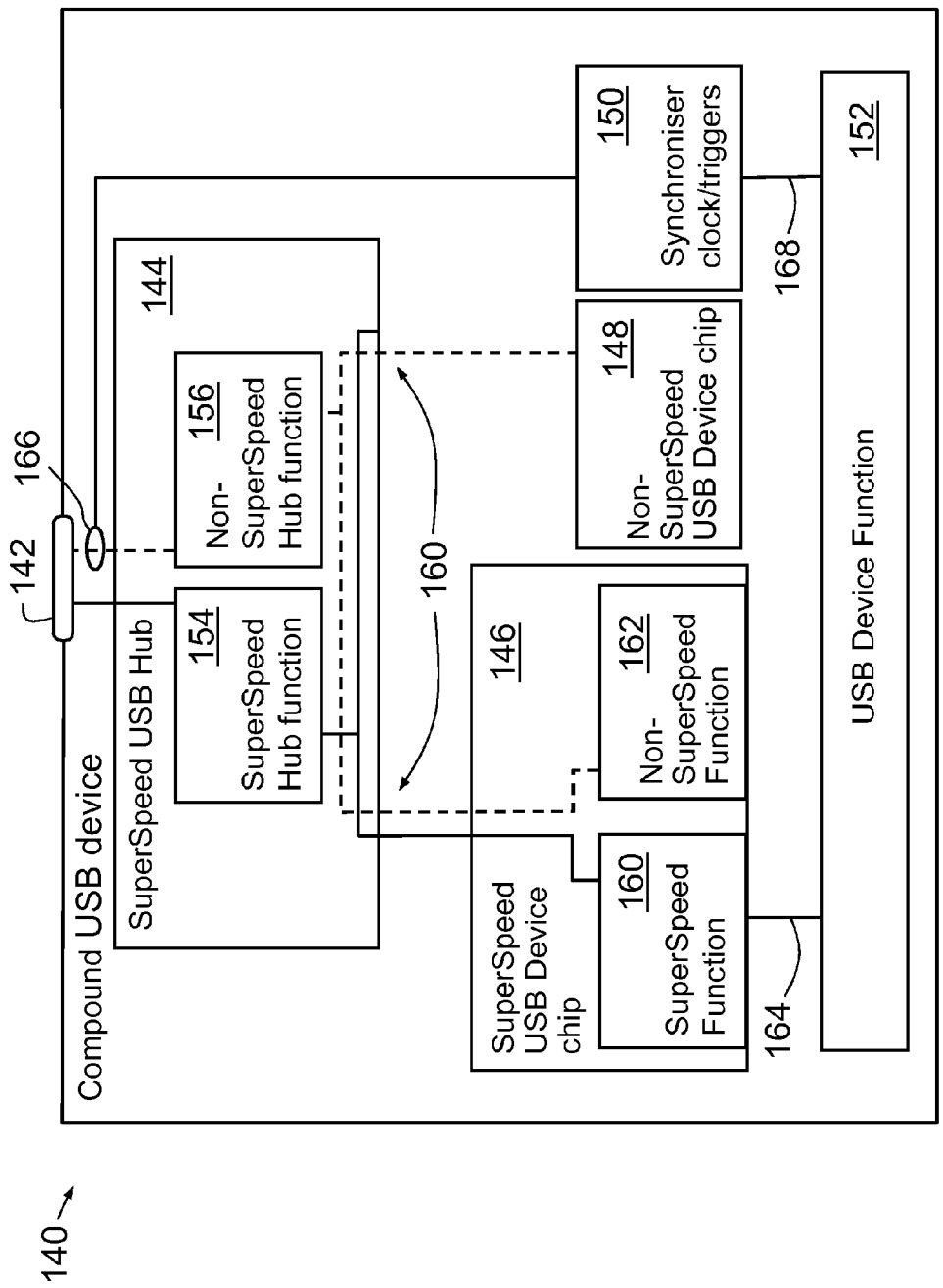
FIG. 4A is a schematic diagram of a compound Super-Speed USB device according to an embodiment of the present invention, which communicate with a USB Host Controller through a SuperSpeed communication channel while being synchronised across a non-SuperSpeed synchronisation channel.

FIG. 4A is a schematic view of a compound USB device 140 according to another embodiment of the present invention. According to this embodiment, compound USB device 140 has an upstream port 142 for connection to a USB, a SuperSpeed USB Hub 144, a SuperSpeed USB device chip 146, a non-SuperSpeed USB device chip 148, a synchroniser 150 and a USB Device Function 152.

SuperSpeed USB Hub 144 contains a SuperSpeed Hub function 154 and a non-SuperSpeed Hub function 156, each allowing connection of their respective busses on at least two downstream ports 158. SuperSpeed USB device chip 146 contains a SuperSpeed function 160 and a non-SuperSpeed function 162, as per the requirements of a compliant SuperSpeed USB device, and communicates with Device Function 152 across a communication bus 164. SuperSpeed USB device chip 146 therefore controls Device Function 152 and controls data flow between an upstream USB Host Controller (not shown) and Device Function 152 via a SuperSpeed USB connection. USB Device Function 152 may be a data acquisition device, a motion controller or any other external interface between Compound USB Device 140 and the outside world.

Synchroniser 150 observes the non-SuperSpeed USB data stream into and out of non-SuperSpeed USB device chip 148 at a detection point 166, and locks a local clock of synchroniser 150 (not shown) to periodic data structures contained within that non-SuperSpeed USB data stream. Non-SuperSpeed USB device chip 148 is provided to ensure that SuperSpeed USB Hub 144 passes non-SuperSpeed data traffic to allow synchronisation of a local clock by synchroniser 150. Synchroniser 150 is also able to communicate with SuperSpeed USB device chip 146 via a data connection 168 and USB Device Function 152 or, in one variation, through an optional direct channel (not shown) between synchroniser 150 and SuperSpeed USB device chip 146 in order to allow the USB Host Controller to provide additional information to synchroniser 150, so that synchroniser 150 can synchronise its syntonised local clock to a specific common notion of time and provide trigger signals as appropriate to USB Device Function 154.

Figure 4B:
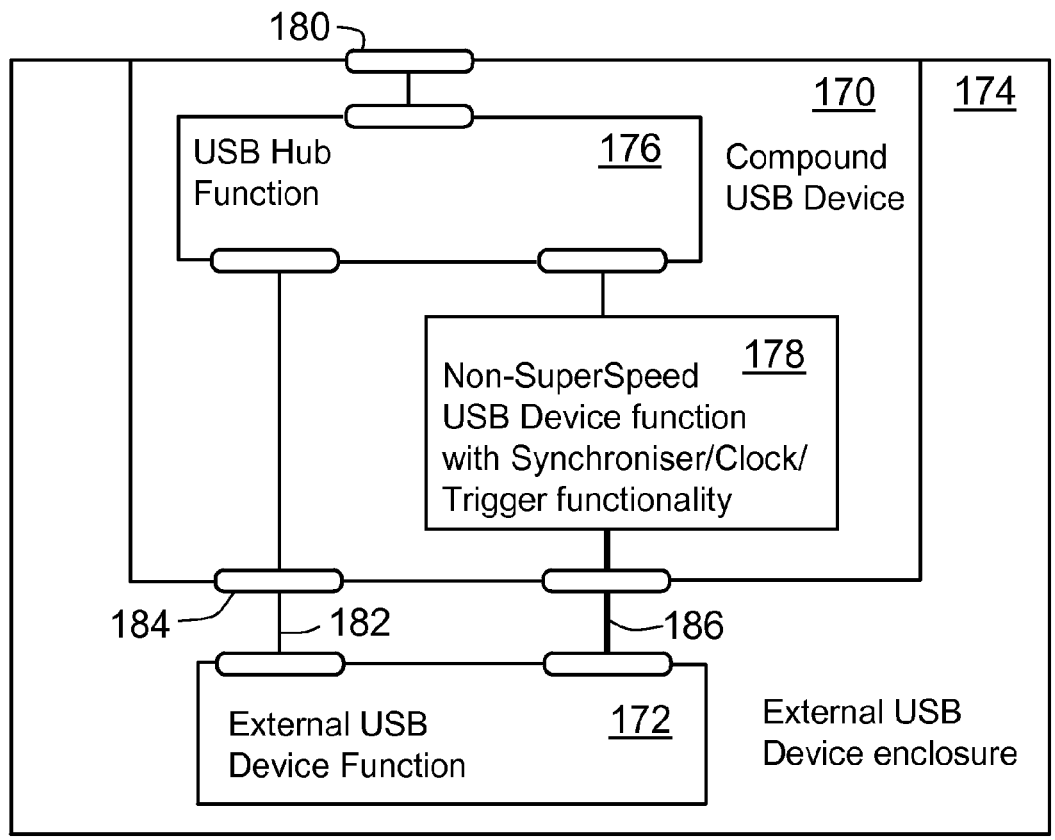
FIG. 4B is a schematic diagram of a compound Super-Speed USB device combined with an external USB device function within a single enclosure according to an embodiment of the present invention.

FIG. 4B is a schematic view of a compound USB device 170 according to another embodiment of the present invention, housed with a separate External USB Device 172 within an External USB Device Enclosure 174.

Compound USB device 170 contains a USB Hub function 176 and a non-SuperSpeed USB device function 178. Non-SuperSpeed USB device function 178 contains synchroniser/local clock/trigger functionality comparable to synchroniser 150 of FIG. 4A. Compound USB device 170 has an upstream port 180, and is connected to a USB (not shown) via upstream port 180. Compound USB device 170 is connected to External USB Device 172 via both a standard USB connection 182 (from one of one or more downstream Hub ports 184 of compound USB device 170) and a synchronisation bus 186.

Synchronisation bus 186 may contain clock signals, information relating to a notion of time and trigger signals (among other synchronisation information) and may be bidirectional. Typically such signals would be driven from the Compound USB device 170 to separate External USB Device 172 such that the operation of External USB Device 172 is controlled directly by the clock and time information of Compound USB Device 170.

The present embodiment also allows clock, time and trigger information to be driven from External USB Device 172 to the Compound USB device 170. In this way events and external trigger signals can be time stamped by the non-SuperSpeed USB device function 176 of Compound USB device 170. Additionally the free running clock of External USB Device 172 may be measured by the synchronised local clock of the non-SuperSpeed USB device function 178 and measurements made by External USB Device 172 may be stamped with the corrected synchronised notion of time of the time non-SuperSpeed USB device function 178 (such as according to the method of the twenty-seventh aspect of the invention of U.S. application No. 61/179,904, referred to above).

This embodiment allows an existing non-synchronised USB product (such as External USB Device 172) to be synchronised by adding Compound USB device 170 to the product in a common enclosure, but with minimal changes to that product.

Figure 5:
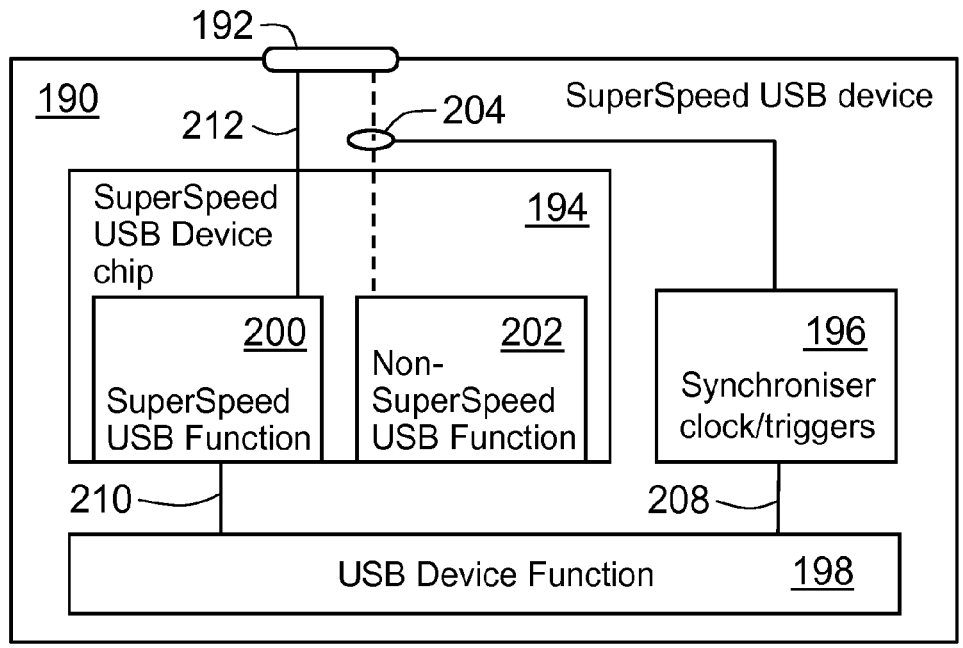
FIG. 5 is a schematic representation of a SuperSpeed USB device that allows both a SuperSpeed communication channel and a non-SuperSpeed synchronisation channel simultaneously according to an embodiment of the present invention.

FIG. 5 is a schematic representation of a SuperSpeed USB device 190 according to another embodiment of the present invention. In this embodiment SuperSpeed USB device 190 has an upstream port 192 for communicating toward an upstream USB Host Controller (not shown), a SuperSpeed USB device chip 194, a synchroniser 196 and a USB Device Function 198.

SuperSpeed USB device chip 194 has a SuperSpeed USB function 200 and a non-SuperSpeed (or USB 2.0) USB function 202, as per the requirements of the USB specification. SuperSpeed USB function 200 and non-SuperSpeed USB function 202 have different Globally Unique Identifiers (GUIDs) and will be registered as two different devices by an operating system. SuperSpeed USB device 190 also has a container ID (not shown) that specifies that SuperSpeed USB function 200 and non-SuperSpeed USB function 202 are part of the same physical compound device (viz. SuperSpeed USB device 190) allowing the operating system to combine them logically.

Alternatively, a modified (hence non-compliant) USB Hub device allows both SuperSpeed and non-SuperSpeed signals to be sent to SuperSpeed USB device 190 at the same time. That is, SuperSpeed and non-SuperSpeed signals can be sent to a modified USB Hub device at the same time.

Synchroniser 196 observes non-SuperSpeed USB data traffic at a detection point 204 (on a non-SuperSpeed connection 206 between upstream port 192 and non-SuperSpeed USB function 202) to synchronise a local clock (not shown) of synchroniser 196 to periodic data structures contained within the USB Data stream and to a notion of time of the USB Host Controller.

Synchroniser 196 is also able to communicate with SuperSpeed USB Device chip 194 through USB Device Function 198 via a timing channel 208 (or, in one variation, through a direct channel (not shown) between synchroniser 196 and SuperSpeed USB Device chip 194), in order to allow the USB Host Controller to provide additional information to synchroniser 196, so that synchroniser 196 can synchronise its syntonised local clock to a specific common notion of time and provide trigger signals as appropriate to USB Device Function 198.

SuperSpeed USB Device 190 includes a communication bus 210 between SuperSpeed USB function 200 and USB Device Function 198, so that SuperSpeed USB function 200 can communicate with USB Device Function 198 across communication bus 210. SuperSpeed USB device chip 194 therefore controls USB Device Function 198, and also controls data flow between the USB Host Controller and USB Device Function 198 via a SuperSpeed USB connection 212 between SuperSpeed USB Function 200 and USB Device Function 198. USB Device Function 198 may be a data acquisition device, a motion controller or any other external interface between SuperSpeed USB Device 190 and the outside world.

In one variation of this embodiment, SuperSpeed USB Device 190 is able to be synchronised by specific timing signals that have been multiplexed onto the non-SuperSpeed USB D+/D− data signalling lines (by, for example, a modified Hub device as described above). In this variation, Synchroniser 196 synchronises its local clock (not shown) and notion of time to the signals (which may include, clock, trigger, loop-time measurement signals and a notion of time among other timing information) originating from a USB Timing Hub rather than to non-SuperSpeed data that contains periodic clock carrier signals.

Figure 6:
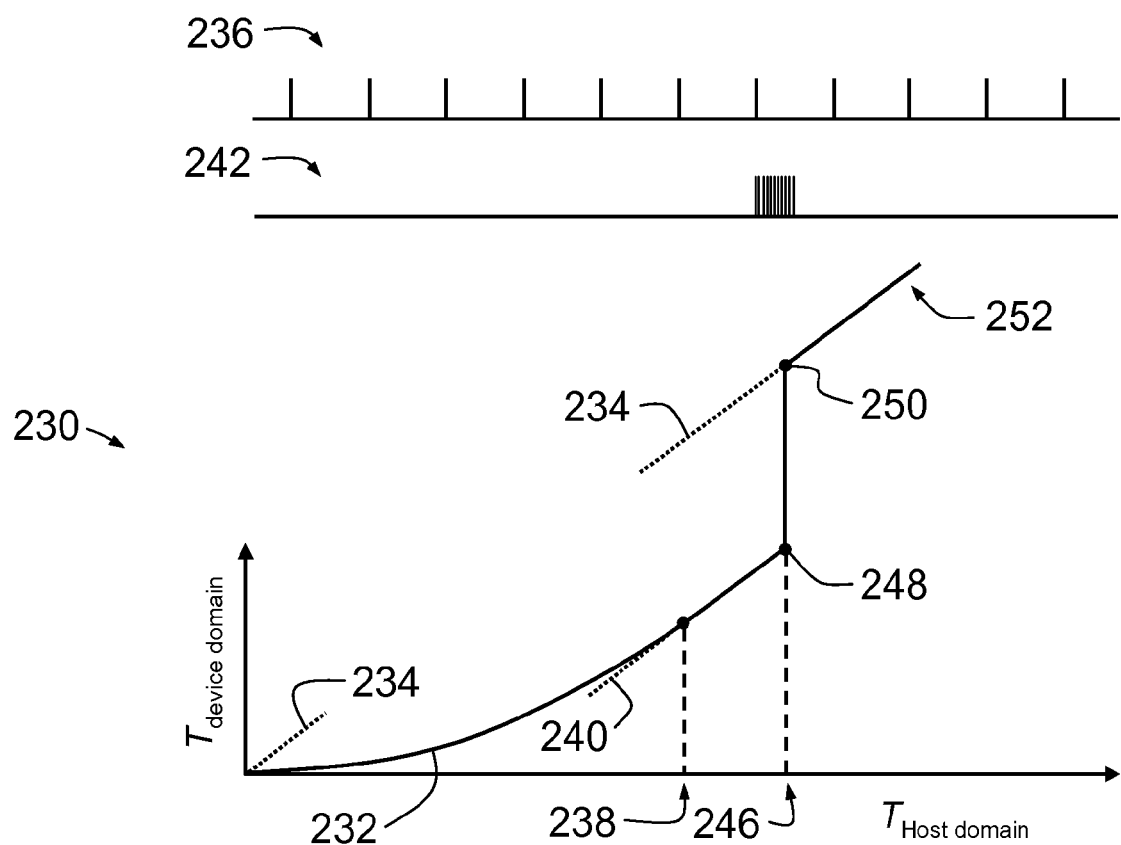
FIG. 6 is a graphical representation of a synchronisation method according to an embodiment of the present invention.

FIG. 6 illustrates a synchronisation method according to another embodiment of the present invention. The lower register of FIG. 6 contains a plot 232 of time in a time domain ($T_{device\ domain}$) of a USB device against time in a time domain ($T_{Host\ domain}$) of a USB Host. If the two time domains were syntonised and synchronised, curve 232 would be a straight line 234 passing through the origin.

Referring to the upper register of FIG. 6, in a typical scenario the USB Host sends a plurality of substantially periodic syntonisation signals 236 to the USB device. The local clock controller of the USB device adjusts the frequency of the local clock and the rate of evolution of the USB device's notion of time ($T_{device\ domain}$) begins to approach the rate of evolution of the USB Host's notion of time ($T_{Host\ domain}$). Referring to the lower register of FIG. 6, it will be seen that, at some point in time 238, the USB device's notion of time is evolving at the same rate as the USB Host's notion of time; that is, the gradient 240 of curve 232 is the same as that of straight line 234.

The two time domains are then said to be syntonised, but the notions of time are not the same, as may be seen from the vertical offset between the time curve 232 and the straight line 234 at time 238. At some point after the devices have been syntonised, however, Synchronisation Messaging 242 is sent between the USB Host and the USB device in order to facilitate synchronisation of their time domains. At point 246, the USB device's notion of time is adjusted such that it conforms to the USB Host's notion of time. This is shown by the transition of time from USB device time at 248 to 250 and the point where synchronisation occurs 246. The two clocks have been synchronised by a single messaging event at 246 and the plurality of syntonisation signals 236 ensure that the time domain of the USB device tracks that of the USB Host (at 252).

It will be apparent to those skilled in the art that Synchronisation Messaging 242 may be initiated be either party to determine the relative notions of local time. It is also possible to synchronise or adjust the time domain of either party in order to synchronise the pair.

Figure 7:
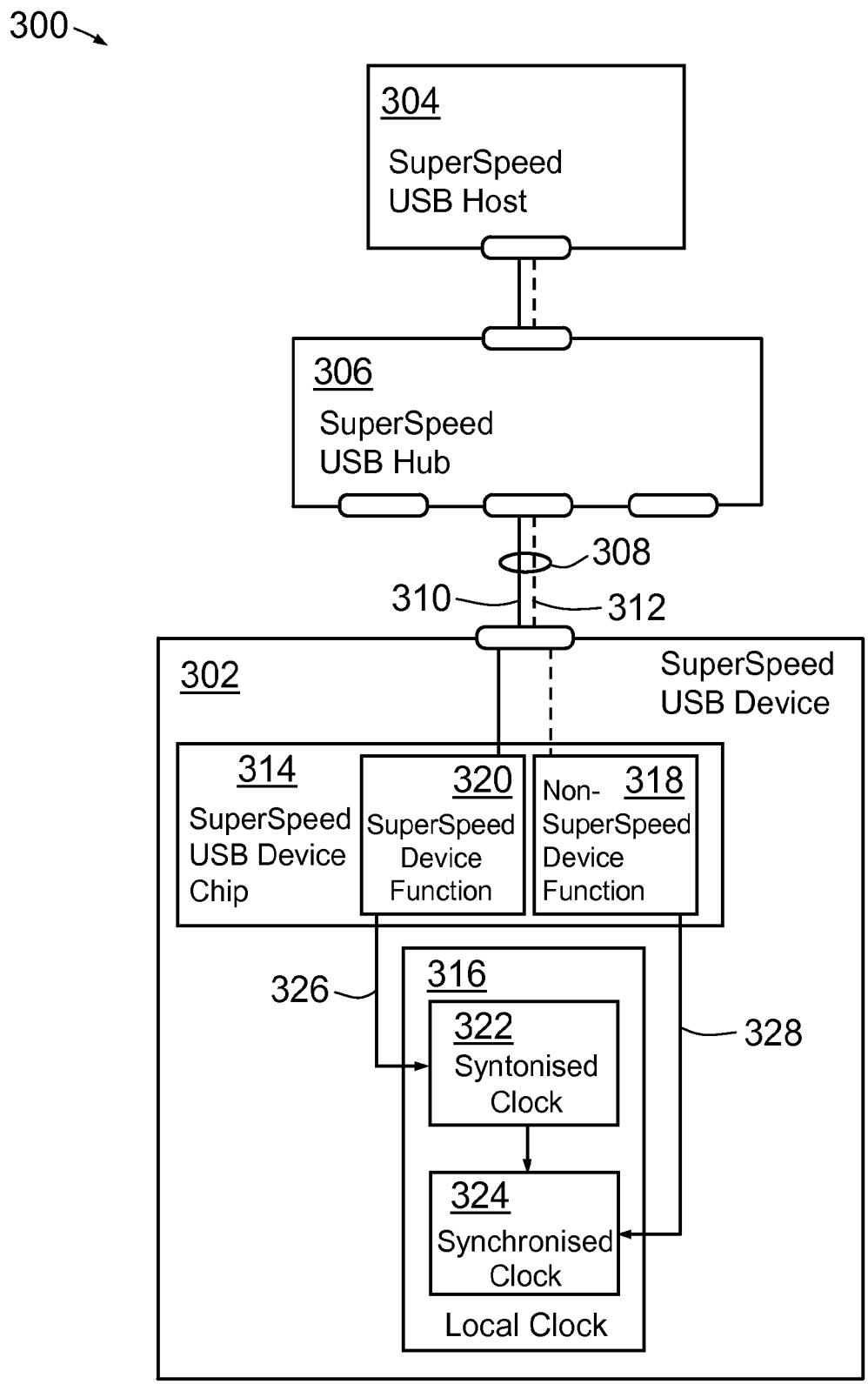
FIG. 7 is a schematic representation of a USB device, employing both SuperSpeed and non-SuperSpeed synchronisation components, according to an embodiment of the present invention.

FIG. 7 is a schematic representation 300 of a USB device 302 employing both SuperSpeed and non-SuperSpeed synchronisation components according to another embodiment of the present invention, shown with SuperSpeed USB Host 304 (typically in the form of a personal or other computer) and SuperSpeed USB Hub 306. According to this embodiment, synchronisation of SuperSpeed USB Device 302 (including syntonisation of the clock frequency and synchronisation of clock phase) with a comparable device attached to the same USB Host 304 is achieved using both SuperSpeed and non-SuperSpeed busses.

SuperSpeed USB devices have the ability to control a local clock's frequency such that the local clock is slaved to a roughly periodic but timestamped signal (plurality of Isochronous Timestamp Packets) delivered from a host computer. In this way, a plurality of SuperSpeed USB devices, such as USB device 302, can be accurately syntonised. SuperSpeed USB, however, is limited in its ability to accurately control the phase of such a local clock. This means that, although the clocks of a plurality of USB devices may be running at the same rate, there is uncertainty in the phase of each local clock, rendering them unusable for a variety of precision timing applications.

Non-SuperSpeed USB by comparison is a broadcast bus. Messages sent from the host computer are repeated by every active hub in the network to all downstream ports not directly operating a SuperSpeed USB link. It is therefore possible to send a command to all attached non-SuperSpeed USB devices at the same time, with the command received (as a plurality of respective commands) by the plurality of non-SuperSpeed USB devices substantially simultaneously (to within a signal propagation time uncertainty).

It is also possible to measure the round-trip time of signals from a common point in a network to each of a plurality of devices and back again. This provides information about the relative signal propagation time of a signal from this common point in the USB network, such as a hub at the top of the tiered star network, to each of the plurality of USB devices on the non-SuperSpeed USB network. This is accomplished by sending a plurality of specific signal structures to each of the non-SuperSpeed USB devices and watching or monitoring for the specific return signal from each of those devices. Statistical means may then be used to determine a relative propagation time for each of these devices.

Each of the non-SuperSpeed USB devices is then able to apply a phase offset, related to their specific relative propagation time, to a common broadcast signal, producing a phase adjusted local broadcast signal that is synchronous across all attached non-SuperSpeed USB devices.

Thus, in this embodiment, USB device 302 is connected to USB Host 304 via SuperSpeed USB Hub 306; USB Hub 306 includes circuitry for enabling USB Hub 306 to measure the round trip propagation time of signals sent across the non-SuperSpeed USB signal lines to each of the attached downstream non-SuperSpeed USB devices. (It will be appreciated by those in the art that references to "round trip propagation time of signals" may refer not to the propagation time of signals that actually return to their point of origin, but instead to the total of the propagation times of a pair of signals comprising an original signal sent downstream and of a response signal sent upstream to the origin of the original signal, the response signal having been generated in response to receipt of the original signal.) USB device 302 is connected to SuperSpeed USB Hub 306 by a cable 308, which includes a SuperSpeed USB connection 310 (for SuperSpeed USB signals) and a non-SuperSpeed USB connection 312 (for non-SuperSpeed USB signals).

SuperSpeed USB device 302 includes a SuperSpeed USB Device Chip 314 and local clock 316. SuperSpeed USB Device Chip 314 has a non-SuperSpeed device function 318 and a SuperSpeed USB device function 320. Local clock 316, when syntonised, is referred to as syntonised clock 322 and, when synchronized, as synchronized clock 324.

According to this embodiment, USB Device 302 is configured to operate as follows. USB Device 302 opens a communication channel to USB Host 304 via non-SuperSpeed USB connection 312. A plurality of specific signal structures are sent from USB Host 304 to non-SuperSpeed device function 318 of USB Device Chip 314. Non-SuperSpeed device function 318 responds to each of these specific signal structures with a predetermined response signal. A (USB Hub to non-SuperSpeed device function) round-trip propagation time is then measured by USB Hub 306 for each pair of specific signal structure/predetermined response signal, resulting in a plurality of measurements of round-trip propagation time between USB Hub 306 and USB device 302. The propagation time of signals passing from USB Hub 306 to non-SuperSpeed USB device function 318 is then determined statistically from this plurality of measurements. In this way, the signal propagation time of signals from USB Hub 306 to USB device 302, and to any other like USB devices (each attached downstream of USB Hub 306 and containing a like non-SuperSpeed USB device function) can be determined, and hence the relative signal propagation time of these signals (that is, relative either to any one of the USB devices or to some other predefined standard). Likewise, the respective relative phase delays of each of such like USB devices can be determined, following which the USB devices can be informed of their respective relative phase by USB Host 304. These respective relative phase delays are determined by the Host Controller (or PC) from the measurements reported by the USB Hubs (or more accurately, the USB devices attached to the compound Hub). One device is chosen from the plurality of attached devices and all round-trip time measurements are compared to that one (which may be, for example, the USB device with the smallest round-trip time, such that the other USB devices have positive (greater) relative propagation times).

USB device 302 then opens a communication channel to USB Host 304 via SuperSpeed USB connection 310. An isochronous pipe is opened between the USB Host 304 and SuperSpeed USB device function 320. SuperSpeed USB device function 320 decodes the plurality of Isochronous Timestamp Packets from SuperSpeed USB Host 304 and generates a control signal 326 that locks the frequency of syntonised clock 322 using the Isochronous Timestamp Packet methodology of SuperSpeed USB. Accordingly, the frequency of syntonised clock 322 can be accurately controlled by USB Host 304. In this way, a plurality of SuperSpeed USB devices, including and comparable to USB device 302, can be accurately syntonised, although there may be a significant phase uncertainty between each of said plurality of local clocks.

USB device 302 then temporarily opens a non-SuperSpeed communication channel (via non-SuperSpeed connection 312) to USB Host 304, while maintaining the frequency of local clock 316; a conventional clock holdover method is acceptable to maintain syntonisation for short periods without regular isochronous timestamp packets. In any event, it may only be necessary to open this non-SuperSpeed communication channel for one or a few USB frames before switching back to a SuperSpeed communication channel (via SuperSpeed USB connection 310) and continuing syntonisation via the periodic isochronous timestamp packets.

USB Host 304 then broadcasts a synchronisation signal or packet to non-SuperSpeed USB device function 318. This synchronisation packet may be a numbered USB Start of Frame packet or any other packet allowed by USB. Non-SuperSpeed USB device function 318 generates a phase adjusted synchronisation signal 328, which it passes to local clock 316 to create a synchronised clock 324 by adjusting the phase of syntonised clock 322.

In a system containing a plurality of USB devices comparable to USB device 302, each of these USB devices upon receiving its synchronisation packet would generate a phase adjusted local synchronisation signal (cf. signal 328) dependent on the respective phases (which may be expressed as relative phases) of their respective local clocks. The phase of each of the resulting syntonised clocks (cf. syntonised clocks 322) can then be adjusted according to their respective local synchronisation signal 328, resulting in a plurality of synchronised clocks (cf. synchronised clocks 324) that are synchronised in frequency and phase to an arbitrary degree.

USB device 302 then switches communication back to the SuperSpeed USB connection 310. Local clock 316 comes out of holdover with active control of syntonised clock 322 resuming via control signal 326.

It will be apparent to those skilled in the art that once the clocks of one or more such USB devices are synchronised to each other in phase in this manner, these USB devices may operate at SuperSpeed USB communication rates (of up to 5 GB/s) while maintaining clocks that are synchronised to an arbitrary degree.

Figure 8:
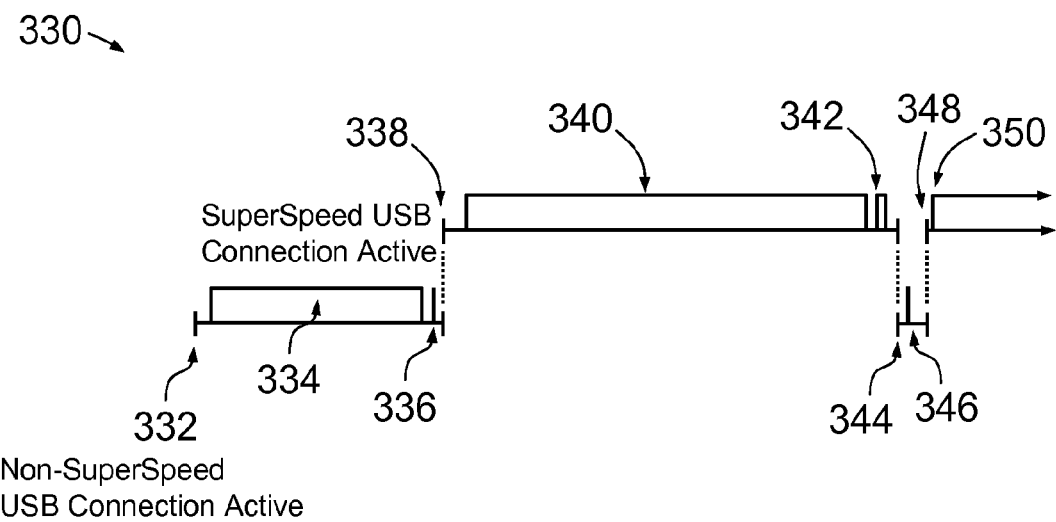
FIG. 8 is a schematic timing diagram of a method of synchronising a compound USB device according to an embodiment of the present invention.

FIG. 8 is a schematic timing diagram 330 of the synchronisation sequence of the embodiment of FIG. 7. At time 332, communication is made to USB device 302 via non-SuperSpeed connection 312. At time 334, a series of signal propagation measurements is made by USB Hub 306. This results in a statistical determination of propagation time, or of relative propagation time if plural USB devices are to be synchronised, as described above. At time 336, the determined propagation time value is (or values are) transmitted from USB Host 304 to USB device 302 (or to the respective USB devices). Alternatively, this may be done while communication is occurring via SuperSpeed USB connection 310.

At time 338, non-SuperSpeed USB connection 312 (or more correctly, the non-SuperSpeed USB channel previously opened over non-SuperSpeed USB connection 312) is closed and a SuperSpeed USB channel to USB device 302 is opened over SuperSpeed USB connection 310. During time period 340 (cf. period 232 to 238 of FIG. 6), local clock 316 is syntonised. At time 342, syntonised clock 322 is placed into holdover so that it maintains its current frequency while SuperSpeed USB connection 310 is briefly closed (at time 344) and non-SuperSpeed USB connection 312 is again opened momentarily. At 346 a synchronisation signal is broadcast across non-SuperSpeed USB connection 312. At 348, non-SuperSpeed USB connection 312 is closed and SuperSpeed USB connection 310 reopened. At some point after time 346 and before the resumption of local clock lock to the plurality of Isochronous timestamp packets (at subsequent time 350), local clock 316 is phase adjusted according to the information that was received at time 346, thereby rendering local clock 316 synchronised; communication then continues in SuperSpeed USB mode.

It will be apparent to those skilled in the art that elements of USB device 302 of FIG. 7 may be provided in various ways, and combined where appropriate. For example, local clock 316 may be provided on or as a part of USB Device Chip 314. Other combinations are possible and may be desirable in certain applications.

Furthermore syntonised clock 322 may employ predictive filtering techniques to minimise drift during the period between times 344 and 348 during which syntonisation information is unavailable to syntonised clock 322. One such suitable method of predictive filtering is with a Kalman filter. This approach produces estimates of the true values of measurements and their associated calculated values by predicting a value, estimating the uncertainty of the predicted value, and computing a weighted average of the predicted value and the measured value. The greatest weight is given to the value with the least uncertainty. The estimates produced by the method tend to be closer to the true values than the original measurements because the weighted average has a better estimated uncertainty than either of the values that went into the weighted average. Thus, in a particular embodiment of USB device 302, Kalman filtering is employed to reduce frequency drift of syntonised clock 322.

The above-described technique may also be employed in a compound USB device, which contains a SuperSpeed USB Hub function, a SuperSpeed USB device function (which must contain a non-SuperSpeed USB Device function in order to comply with the USB3 Specification) and an additional non-SuperSpeed USB device function. In this embodiment of the invention, syntonisation can be affected by either a conventional synchronised USB approach (such as that of Foster et al., WO 2007/092997) whereby the local clock is syntonised to, for example, non-SuperSpeed USB Start of Frame (SOF) packets, or by the approach described above (that is, with Isochronous Timestamp packets using the SuperSpeed USB device function). In either case, synchronisation occurs via a non-SuperSpeed USB synchronisation signal and propagation time determined clock phase compensation.

Figure 9:
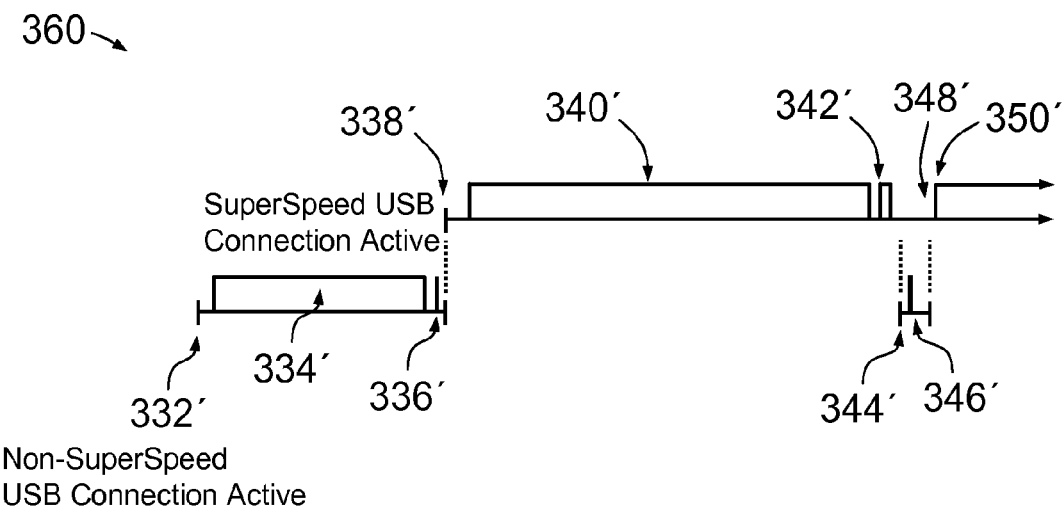
FIG. 9 is a schematic timing diagram of yet another method of synchronising a compound USB device according to an embodiment of the present invention.

The technique described above by reference to FIGS. 7 and 8 may also be employed with a modified USB hub modified so that it can broadcast Start of Frame (SOF) packets to ports that have a device operating in SuperSpeed mode. Conventionally, when a USB device connects in SuperSpeed USB mode to a SuperSpeed compliant USB hub, the USB hub must not communicate across the non-SuperSpeed channel. Generally, the only reason that it is desirable to transmit SOF packets while the USB device is connected in SuperSpeed USB mode and syntonised using the SuperSpeed Isochronous Timestamp Packet method is to provide a synchronisation signal to all USB devices connected to a USB common hub once syntonisation has been completed. To achieve this, one or more (and typically a few) SOF packets would be delivered during the period between times 344 and 348 of the timing diagram of FIG. 8. FIG. 9 is a schematic timing diagram 360 illustrating this embodiment; timing diagram 360 is similar to diagram 330 of FIG. 8, so like (though primed) reference numerals have been used to identify like features. USB device 302 remains connected to a SuperSpeed USB channel via SuperSpeed USB connection 310 throughout the period between times 344' and 348', and the modified USB hub allows connection of the non-SuperSpeed USB device during this period to provide a synchronisation signal at time 346'.

It is further desired to combine the method described in FIG. 8 with the method of the third broad aspect of the present invention.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention and in the claims that follow, except where the context requires otherwise owing to express language or necessary implication, the expression "Host Controller" embraces all forms of USB Host Controller, including standard USB Host controllers, USB-on-the-go Host Controllers and wireless USB Host Controllers.

In the preceding description of the invention and in the claims that follow, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such background art forms or formed a part of the common general knowledge in any country.

The invention claimed is:

1. A compound USB device, comprising:
   first circuitry, adapted to perform at least one SuperSpeed USB device function;
   second circuitry, adapted to perform at least one non-SuperSpeed USB device function;
   hub circuitry adapted to perform a SuperSpeed USB hub function that provides an upstream connection that comprises a SuperSpeed USB connection and a non-SuperSpeed USB connection, and downstream connectivity to said first circuitry and to said second circuitry;
   a local clock; and
   synchronising circuitry for synchronising said local clock using synchronisation information in either the SuperSpeed USB connection or the non-SuperSpeed USB connection;
   wherein said SuperSpeed USB device function and said non-SuperSpeed USB device function operate simultaneously.

2. A compound USB device as claimed in claim 1, wherein:
   the synchronising circuitry is adapted to synchronise said local clock using periodic signal structures in said upstream non-SuperSpeed connection.

3. A compound USB device as claimed in claim 1, wherein:
   the synchronising circuitry is adapted to syntonise said local clock via said upstream SuperSpeed USB connection;
   the compound USB device further comprising holdover circuitry, adapted to provide a holdover function for said local clock; and
   phase adjust circuitry adapted to phase adjust an output of said local clock.

4. A compound USB device as claimed in claim 3, further comprising predictive filtering circuitry adapted to stabilise a frequency of said local clock in a temporary absence of syntonisation information.

5. A compound USB device as claimed in claim 1, wherein:
   the synchronisation circuitry is adapted to syntonise said local clock via said upstream SuperSpeed USB connection;
   the compound USB device further comprising holdover circuitry, adapted to provide a holdover function for said local clock; and
   phase adjust circuitry, adapted to adjust a phase of syntonisation signals prior to syntonising said local clock.

6. A compound USB device as claimed in claim 5, further comprising predictive filtering circuitry adapted to stabilise a frequency of said local clock in a temporary absence of syntonisation information.

7. A compound USB device as claimed in claim 1, wherein:
   the compound USB device further comprises third circuitry, adapted to provide a non-SuperSpeed synchronisation channel across said non-SuperSpeed USB connection.

8. A method of synchronising a SuperSpeed USB device in a USB network, comprising:
   establishing a non-SuperSpeed communication channel to a non-SuperSpeed USB function of said SuperSpeed USB device;

measuring a propagation time of a signal or signals from a predefined point in the USB network to said SuperSpeed USB device and back;

establishing a SuperSpeed USB communication channel to a SuperSpeed USB function of said SuperSpeed USB device;

syntonising a local clock of said SuperSpeed USB device using the periodic Isochronous Timestamp Packets in the SuperSpeed USB communication channel;

placing said local clock into a holdover mode wherein said local clock frequency is maintained constant in a temporary absence of syntonisation information;

re-establishing a non-SuperSpeed communication channel to a non-SuperSpeed USB function of said SuperSpeed USB device;

transmitting a synchronisation signal to said SuperSpeed USB device;

re-establishing a SuperSpeed USB communication channel to a SuperSpeed USB function of said SuperSpeed USB device;

removing said local clock from said holdover mode and continuing syntonisation lock of said local clock to said Isochronous Timestamp Packets;

transmitting a phase signal to said SuperSpeed USB device indicative of the phase compensation required to synchronise said local clock; and synchronising said local clock by applying said phase compensation to said local clock.

9. A method as claimed in claim 8, comprising using predictive filtering to reduce drift of said local clock during said holdover period.

10. A method of synchronising a compound SuperSpeed USB device, comprising:

providing data communication between a host computing device and the compound SuperSpeed USB device across a SuperSpeed USB communication channel;

establishing a SuperSpeed USB communication channel to a SuperSpeed USB function of said compound USB device;

establishing a non-SuperSpeed synchronisation channel to a non-SuperSpeed USB function of said compound USB device; and synchronising a local clock of said compound USB device to a periodic data structure within a data stream in said non-SuperSpeed synchronisation channel so that said local clock can enable synchronous operation of said compound USB device with one or more comparable USB devices.

11. A method as claimed in claim 10, wherein synchronising said local clock comprises syntonisation of clock frequency and phase compensation of a clock signal issued by the local clock by a predefined amount.

* * * * *